UNITED STATES PATENT OFFICE.

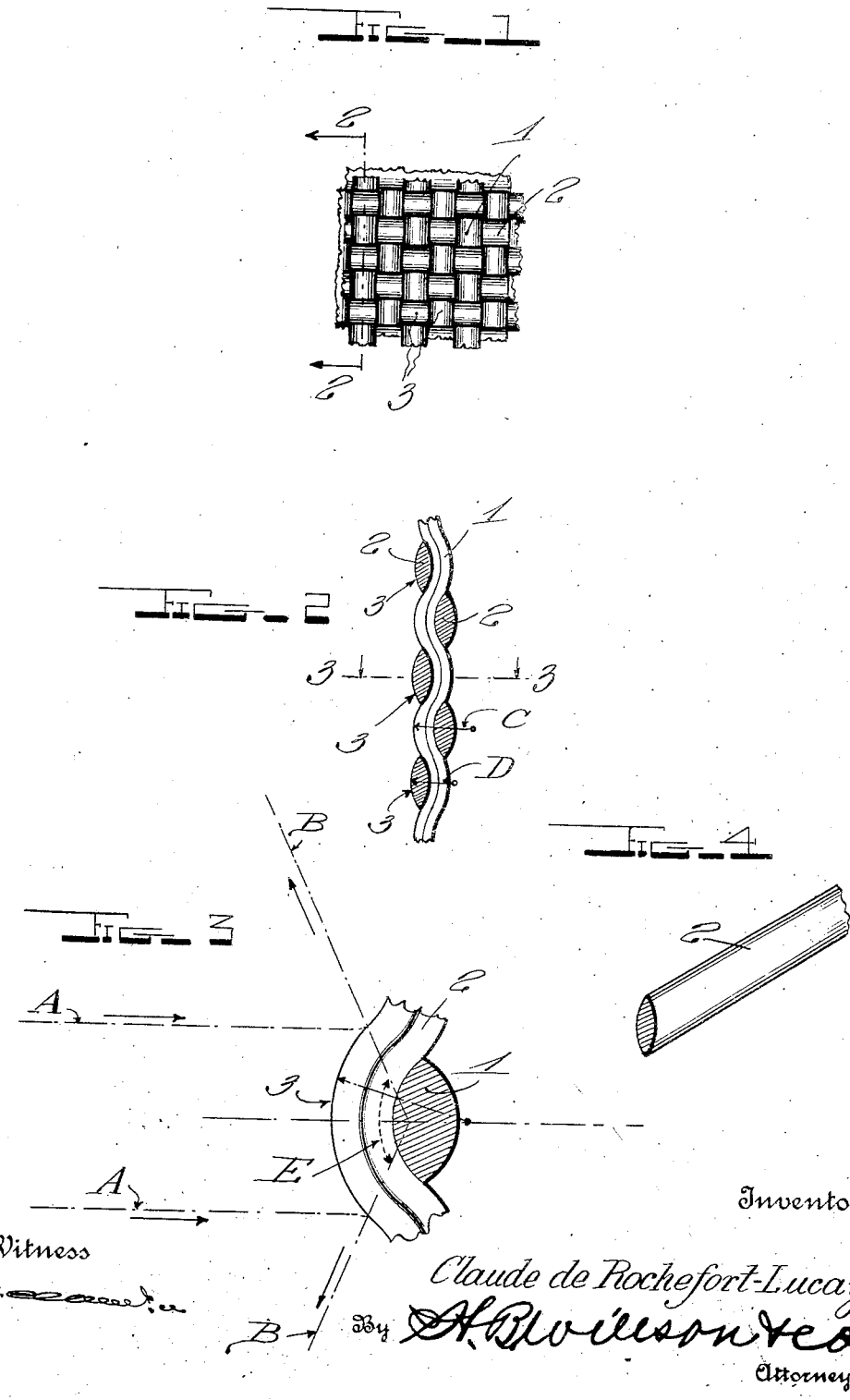

CLAUDE DE ROCHEFORT-LUCAY, OF NEW YORK, N. Y.

METALLIC PHOTOGRAPHIC PROJECTION SCREEN.

1,403,742.         Specification of Letters Patent.     Patented Jan. 17, 1922.

Application filed January 24, 1921. Serial No. 439,636.

*To all whom it may concern:*

Be it known that I, CLAUDE DE ROCHEFORT-LUCAY, a citizen of France, residing at New York, in the county of New York and State of New York, have invented certain new and useful Improvements in Metallic Photographic Projection Screens; and I do declare the following to be a full, clear, and exact description of the invention, such as will enable others skilled in the art to which it appertains to make and use the same.

My invention relates to improvements in photographic projection screens and more particularly to those of all metal construction, the object of my invention being to provide a screen constructed of polished interwoven wires of double convex form in transverse section, so that as the longitudinal and transverse wires assume a serpentine formation during the interweaving process, a multiplicity of convex mirrors or reflectors are formed of the obverse faces of the wires which are exposed to receive the rays of light from a moving picture or other projection machine.

With the foregoing in view, the invention resides in the construction of the screen hereinafter described and claimed, the descriptive matter being supplemented by the accompanying drawings.

Figure 1 is a front elevation of a portion of the screen constructed in accordance with my invention.

Figure 2 is an enlarged vertical sectional view as indicated by line 2—2 of Fig. 1.

Figure 3 is an enlarged horizonotal sectional view as designated by line 3—3 of Fig. 2.

Figure 4 is a sectional perspective view of one of the wires.

In carrying out my invention, I make use of a plurality of strands of approximately flat wire, thinned toward its edges however into double convex form as shown in Figs. 2, 3 and 4. Vertical strands 1 and horizontal strands 2 of this wire are closely interwoven to form practically a solid structure having no interstices between the several strands, so that the complete screen will be entirely impervious to light. At least the obverse faces of the strands 1 and 2 are highly polished and it will be seen that the interweaving of said strands will form of them a multiplicity of reflectors or mirrors 3, each mirror being convex in one direction on the radius C (Fig. 2) and convex in the other direction on the radius D of this figure. These reflecting surfaces each tend to reflect the light rays from the projection machine, in conical volumes as will be clear by reference to Fig. 3. In this figure, the lines A represent the substantially parallel rays of light projected onto one of the mirrors 3, while the lines B indicate the conical volume of light reflected. The angle E between the lines B may be varied only by changing the radii C and D.

By employing the construction disclosed, a screen is produced whose entire surface possesses such reflective qualities as to be equally illuminous to all persons situated in front of the same when the light is thrown from the projector, and since excellent results are obtainable from the details shown, such details are preferably followed, but within the scope of the invention as claimed, minor changes may of course be made.

I claim:

1. A photographic projection screen comprising closely interwoven longitudinal and transverse wires of double convex form in transverse section.

2. A photographic projection screen comprising closely interwoven longitudinal and transverse wires of double convex form in transverse section, the obverse faces of said wires being highly polished to form a multiplicity of convex reflectors.

In testimony whereof I have hereunto set my hand.

CLAUDE DE ROCHEFORT-LUCAY.